(12) United States Patent
Starrett

(10) Patent No.: US 7,248,247 B2
(45) Date of Patent: Jul. 24, 2007

(54) METHOD AND SYSTEM FOR DETERMINISTIC MATCHING OF OBJECTS AND EVENTS WHICH ARE NOT UNIQUELY IDENTIFIED

(75) Inventor: Cortland D. Starrett, Brookston, IN (US)

(73) Assignee: Pitney Bowes Inc., Stamford, CT (US)

( * ) Notice: Subject to any disclaimer, the term of this patent is extended or adjusted under 35 U.S.C. 154(b) by 840 days.

(21) Appl. No.: 10/678,831

(22) Filed: Oct. 3, 2003

(65) Prior Publication Data

US 2005/0076047 A1 Apr. 7, 2005

(51) Int. Cl.
*G09G 5/00* (2006.01)

(52) U.S. Cl. ...................... 345/171; 235/376

(58) Field of Classification Search ............... 345/156, 345/171; 235/376, 375; 198/349.6; 209/584; 700/227; 705/409; 707/101
See application file for complete search history.

(56) References Cited

U.S. PATENT DOCUMENTS

| | | | | |
|---|---|---|---|---|
| 5,008,827 | A * | 4/1991 | Sansone et al. | 705/409 |
| 5,043,908 | A | 8/1991 | Manduley et al. | |
| 5,313,051 | A * | 5/1994 | Brigida et al. | 235/375 |
| 6,557,755 | B1 | 5/2003 | Pickering, Jr. et al. | |
| 6,974,080 | B1 * | 12/2005 | Goggins | 235/462.01 |
| 2005/0065719 | A1 * | 3/2005 | Khan et al. | 701/204 |
| 2005/0071347 | A1 * | 3/2005 | Chau et al. | 707/100 |
| 2007/0045427 | A1 * | 3/2007 | Onishi | 235/494 |

\* cited by examiner

*Primary Examiner*—Nitin I. Patel
(74) *Attorney, Agent, or Firm*—Christopher H. Kirkman; Steven J. Shapiro; Angelo N. Chaclas

(57) ABSTRACT

A method, and a system for carrying out that method, for deterministically matching first elements of a first set of objects or events with second elements of a second set of objects or events. Matching first and second elements are associated with common values of an identification code pn having |pn| characters, and where the identification code can be insufficient to uniquely identify the first elements, and portions of the identification code values associated with the first and second elements can be unknown. The method includes the steps of: a) generating a mapping θ for the first set such that, for each element $l_i$ of the first set $\theta(l_i)$ equals $<k_i, ppn_i>$, where $pn_i$ is at least a portion of the identification code value associated with the element $l_i$ and $ppn_i$ is defined as the first $k_i$ characters of $pn_i$, and $k_i$ is selected to be the minimum number of characters required to uniquely identify $l_i$ in the first set, whereby values for $k_i$ greater than |pn| imply that the element $l_i$ is not uniquely identified by the portion $ppn_i$; b) determining $pn_j$ for an element $e_j$ in the second set, where $pn_j$ is at least a portion of the identification code value associated with the element $e_j$; and c) matching the element $e_j$ and the element $l_i$ only if the first $k_i$ characters of $pn_j$ equal $ppn_i$ and not matching the element $e_j$ and the element $l_i$ if the element $l_i$ is not uniquely identified in the first set by the portion $pn_j$. The system can be controlled in accordance with program code on a computer readable medium. In one embodiment of the invention the first elements are letters and the second elements are events which occur during processing of the letters. In another embodiment of the invention the method includes a step of performing an additional consistency test and matching said letter $l_i$ and event $e_j$ only if said consistency test confirms such match.

21 Claims, 5 Drawing Sheets

METHOD AND SYSTEM FOR DETERMINISTIC MATCHING OF OBJECTS AND EVENTS WHICH ARE NOT UNIQUELY IDENTIFIED

BACKGROUND OF THE INVENTION

Definitions:

| | |
|---|---|
| S: | "the set S" |
| \|S\|: | "the number of elements in S." |
| \|x\|: | "the number of characters in 'x'" |
| S U s: | "the addition of element s to S" |
| <v1, . . . vn>: | "the n-tuple of values vi" |
| →: | "maps to" |

The subject invention relates to deterministic matching of objects or events in a first set with objects or events in a second set when the objects or events are not all uniquely identified. More particularly it relates to matching letters to events which occur during the delivery of such letters. By "deterministic matching" herein is meant matching of events (or elements in the second set) to letters (or elements in the first set) if and only if sufficient information is available to uniquely associate events with particular letters.

It is often useful to be able to match objects or events in a first set with objects or events in other sets. For example, a hypothetical automobile assembly process may require that a particular engine be assembled with a particular style body, paint color, etc. to produce a car as ordered. An effective way to achieve this is to associate codes with the objects or events to be matched so that objects or events which match are associated with the same code. This a relatively simple process where the codes suffice to uniquely identify the objects or events within each set. However, if the codes are not sufficient to uniquely identify the objects or events which match, the task of matching becomes much more difficult. Thus, in the automotive example given above, if order number 123456 calls for a high performance engine but the engine is coded 12345; either because of a mistake or because of a systematic problem (e.g. the engine encoder can only specify 5 digits) it may or may not be possible to deterministically match the engine to an order. Assuming that it is desirable that orders be filled in the normal process where possible, but more important that no unordered cars be assembled; the need for a deterministic matching method can be seen.

An actual example of a process in which a deterministic matching method can be used to good effect is the mail tracking program recently introduced by the United States Postal Service (hereinafter sometimes "USPS")under the trademark CONFIRM®. The CONFIRM program tracks mailpieces through the delivery process and provides the mailer with information about the status of the mailpiece in the delivery process.

FIG. 1 shows a simplified representation of the USPS mailpiece delivery process incorporating the CONFIRM mail tracking process. Mailers 10 deliver large mailings 12 to local postal facilities 14. Mailings 12 can comprise letters, flats, periodicals, or the like (sometimes hereinafter generally "letters") and are typically pre-sorted to various degrees by mailers 10 to obtain discounts offered by the USPS. (While the general principles of the CONFIRM process can be applied to any mailpiece or package, as currently implemented by the USPS it used for tracking large, typically pre-sorted, mailings and reply mail returned in pre-addressed and pre-coded business reply envelopes (sometimes herein "BRE's") sent out in such mailings.)

At facility 14 scanner 16 scans mailings 12 to establish the times at which mailings 12 entered the mail delivery process. Typically individual letters are not scanned at facility 14, though they can be if appropriate scanners are available, and accompanying documents(not shown) are scanned to establish the time and facility at which each of mailings 12 entered the delivery process and/or the times at which mailings 12 are sent on in the delivery process. This information is then sent to programmable data processing system (hereinafter sometimes server) 22 over one of communications links 20. (Links 20 connect various postal facilities to server 22 and can take any convenient form or forms; details of which form no part of the subject invention.) Mailings 12 and other mailpieces (not shown) are then grouped to form assemblies 28 which are then delivered to sectional postal center 30. At center 30 assemblies 28, together with other assemblies 28 from other facilities (not shown) are processed by conventional high speed scanner/sorters 32. As letters are sorted and otherwise processed at center 30 a POSTNET code (commonly known as a "zipcode" and hereinafter sometimes "pn") and a code used in the CONFIRM process known by the USPS trademark PLANET Code® (hereinafter sometimes "pc") are scanned from the letters. The pair <pn, pc> identify, though not necessarily uniquely identify, the letters within a set of letters, and events associated with those letters, as will be described further below. In accordance with USPS requirements the POSTNET Code and PLANET Code are printed as barcodes. As letters are scanned, typically for the first time at center 30, the values pn and pc are sent to sever 22 over one of links 20, where they are combined with information about mailings 12 from facility 14, as will be described further below. (Note that the PLANET Code for a letter will identify a corresponding mailing so that the time a letter entered the mail delivery process can be determined by sever 22 from information provided by facility 14.)

Sorted assemblies 36 are delivered to local postal facilities 38 for further sorting and delivery of letters 1. Letters 1 can be scanned at facilities by scanners 40 and information including values for pn and pc sent to server 22 over one of links 20. BRE's included in mailings 12 can be returned by the receiving customers and are scanned, sorted and delivered in substantially the same manner as described above, except that BRE's are typically returned as individual letters and, of course need not follow the same path through the postal system as mailings 12.

As a letter moves through the delivery process and various steps or stages occur (hereinafter sometimes "events") and these events are recorded as an n-tuple <d, f, t, pn, pc> where:

d is the time at which the event occurred;
f is the facility at which the event occurred;
t is the type of event;
pn is the POSTNET (possibly partial) scanned from the letter when the event occurs; and
pc is the PLANET Code scanned from the letter when the event occurs.

Server 22 is programmed to match these events with letters having corresponding values for the pair <pn, pc> and maintain database 24 of matched letters and events. Mailers 10 can then access database 24 through server 22 and network 42, or in any other convenient manner, to determine the status of letters in the mail delivery system. However the <pn, pc> data is often incomplete or inaccurate. Further, different letters may have the same values for <pn, pc>. Thus it is not always possible to uniquely match an event and a corresponding letter. Since mailers would rather have no tracking information than incorrect information, there is a need for a deterministic method and system which will match letters and events in the context of the USPS CONFIRM system. Current methods for matching letters and events attempt to match only those cases where the full (11 digit) POSTNET code and PLANET Code are scanned and allow matching of approximately 80 to 85% of events to letters; rejecting the remaining 15 to 20%.

Program code to control server 22 in accordance with the subject invention is provided on magnetic or optical disk 46-D and input through disk reader 46-R, or through any other suitable computer readable medium. The term "computer-readable medium" as used herein refers to any medium that participates in providing program code to a processor for execution. Such a medium may take many forms, including but not limited to, non-volatile media, volatile media, and transmission media. Non-volatile media includes, for example, optical or magnetic disks, or random access read only memory. Volatile media includes random access dynamic memory. Transmission media includes coaxial cables, copper wire and fiber optics. Transmission media can also take the form of acoustic or light waves, such as those generated during radio wave and infrared data communications. By "program code" herein is meant sequences of indicia recorded on, or signals transmitted by, computer readable media, which, when input by a processor cause a processor to carry out a corresponding sequence of operations, i.e. execute the program code.

In FIG. 2 letter 1 includes a delivery address printed in block 50, a return address printed in block 52, a stamp or postal indicium indicating payment of postage 54, PLANET Code barcode 56, and POSTNET barcode 58. Letter 1 can be printed with additional markings which do not relate to the subject invention and can be arranged in somewhat different formats without affect on the teaching of the present application. Barcode 58 typically represents 5, 9, or 11 digits which specify delivery information with increasing precision. The code used is typically determined by the information available to mailer 10 or by the extent which mailer 10 wishes to pre-sort mailings 12. PLANET Code 56 can take on one of two formats, format 56-D to track delivery of letters in mailings 12 and format 56-0 to track BRE's returned by customers. Format 56-D specifies the service (e.g. first class letters, standard mail flats, etc.) subscriber (i.e. mailer) id, and mailing id. Typically there is one PLANET Code used in a mailing. Format 56-0 specifies the service and a customer id. The CONFIRM system relies on the BRE's POSTNET code to identify the mailer.

While generally the POSTNET and PLANET Code, i.e. the pair<pn, pc>, uniquely specify a letter it is apparent that this need not be so. For example, if a mailer 10 chooses not to sort a mailing 12, letters in that mailing may only have a 5 digit POSTNET code with many letters having the same value for pn. Or scanners at various facilities may not have a capability to scan a full 11 digit POSTNET code so that a event record can not always be uniquely associated with a letter record. More rarely, even the full POSTNET code will not distinguish all letters, as when two letters in a mailing are sent to the same address. (Since the CONFIRM system is relatively new it is believed all PLANET Code scanners can scan the full PLANET Code.)

(The above simplified description of the mail delivery process and the CONFIRM system is given to provide background and those skilled in the art will recognize that substantial differences from actual mail delivery can exist. Such differences however are not believed to affect the present teaching. Further details of the CONFIRM system are found in: *The CONFIRM® System Customer Service Guide*, United States Postal Service, publication no. 197, September 2002.)

Thus it is an object of the subject invention to provide a method and system for deterministic matching of objects and events, such as letters and events occurring as the letters are delivered, even though the letters and events are not necessarily uniquely identified.

BRIEF SUMMARY OF THE INVENTION

The above object is achieved and the disadvantages of the prior art are overcome in accordance with the subject invention by a method, and a system for carrying out that method. The method deterministically matches first elements of a first set of objects or events with second elements of a second set of objects or events, matching first and second elements each being associated with common values of an identification code pn having |pn| characters, and where the identification code can be insufficient to uniquely identify the first elements, and portions of the identification code values associated with the first and second elements can be unknown; and includes the steps of: a) generating a mapping θ for the first set such that, for each element $l_i$ of the first set $\theta(l_i)$ equals <$k_i$, $ppn_i$>, where $pn_i$ is at least a portion of the identification code value associated with the element $l_i$ and $ppn_i$ is defined as the first $k_i$ characters of $pn_i$, and $k_i$ is selected to be the minimum number of characters required to uniquely identify $l_i$ in the first set, whereby values for $k_i$ greater than |pn| imply that the element $l_i$ is not uniquely identified by the portion $ppn_i$; b) determining $pn_j$ for an element $e_j$ in the second set, where $pn_j$ is at least a portion of the identification code value associated with the element $e_j$; and c) matching the element $e_j$ and the element $l_i$ only if the first $k_i$ characters of $pn_j$ equal $ppn_i$ and not matching the element $e_j$ and the element $l_i$ if the element $l_i$ is not uniquely identified in the first set by the portion $pn_i$. The system can be controlled in accordance with program code on a computer readable medium.

In accordance with one aspect of the subject invention the first elements are letters and the second elements are events which occur during processing of the letters.

In accordance with another aspect of the subject invention the method includes a step of performing an additional consistency test and matching said letter $l_i$ and event $e_j$ only if said consistency test confirms such match.

In accordance with still another aspect of the subject invention the method includes: a) generating a minimal k-unique mapping for said first set such that, for each element $l_i$ of said first set such that $l_i$ maps to a pair <$k_i$, $ppn_i$>, where $pn_i$ is at least a portion of said identification code value pn associated with said first elements and $ppn_i$ is defined as the first $k_i$ characters of $pn_i$, b) determining $pn_j$ for an element $e_j$ in said second set, where $pn_j$ is at least a portion of said identification code value associated with said element $e_j$; and c) matching said element $e_j$ and said element $l_i$ only if the first $k_i$ characters of $pn_j$ equal $ppn_i$ and not matching said element $e_j$ and said element $l_i$ if said element $l_i$ is not uniquely identified in said first set.

Other objects and advantages of the subject invention will be apparent to those skilled in the art from consideration of the detailed description set forth below and the attached drawings.

BRIEF DESCRIPTION OF THE DRAWINGS

The subject invention is illustrated by way of example, and not by way of limitation, in the figures of the accompanying drawings and in which like reference numerals refer to similar elements and in which.

DETAILED DESCRIPTION OF PREFERRED EMBODIMENTS OF THE INVENTION

Figure 3:
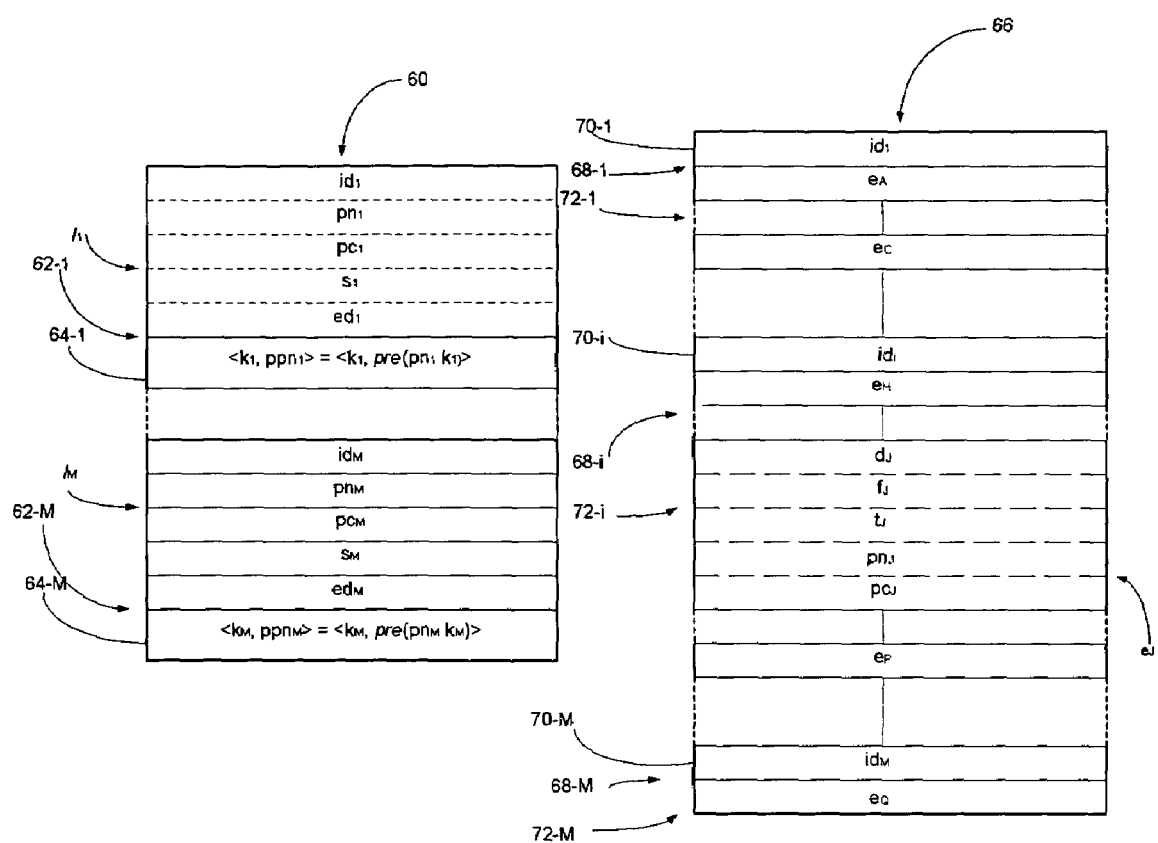
FIG. 3 shows a schematic representation of a database of letters and matched events which occur during the delivery of the letters.

FIG. 3 shows database 24 of letters l and events e. File 60 includes records 62-1 through 62-M, M=|L|, and corresponds to a set L of letters l. Records 62 include fields l which contain n-tuples <id, pn, pc, s, ed> where:

id is a unique identifier for the n-tuple generated by sever 22,
pn is a POSTNET value,
pc is PLANET Code value,
s is the time corresponding physical letters entered the mail process (i.e. the time that the corresponding mailing 12 was received at facility 14), and
ed is the estimated latest time of delivery of corresponding physical letters; and fields 64 contain the pairs <k, ppn>=<k, pre(pn, k)> (where pre(pn, k) is defined as the first k digits of pn) which map to the pair <pn, pc> such that letter l is minimally k-uniquely identified in L by <pn, pc>, as will be describes further below.

Latest time of delivery ed is determined by the USPS in a known manner in accordance with factors such as the type of mail, degree of pre-sorting, etc., and is typically 7 to 14 days. The pair <s, ed> define a life-span of a letter and if a letter is not delivered within its life-span it is unlikely that it will be delivered at all.

File 66 includes records 68-1 through 68-M, and corresponds to events e in set E which are matched to letters l, as will be described further below. Records 68 include fields 70 which contain a value id identifying a letter l and pluralities of fields 72, each field in pluralities 72 containing an event $e_x$ to indicate that events e recorded in one of records 68 are matched to the letter l identified in that record. In FIG. 3 event $e_j$ has been expanded to show n-tuple <$d_j$, $f_j$, $t_j$, $pn_j$, $pc_j$>, as described above.

As discussed above, in general it is not always possible to match letters l and events e. Letter l may not be uniquely identified by pair <pn, pc>, or only a portion of pn may be scanned during the event so that insufficient information is available to uniquely match the event to a letter. Such unmatched events can be handled in any convenient manner, details of which form no part of the present invention.

Those skilled in the art will recognize that database 24 can be organized in other ways, and details of the organization of database 24 form no part of the subject invention.

Figure 4:
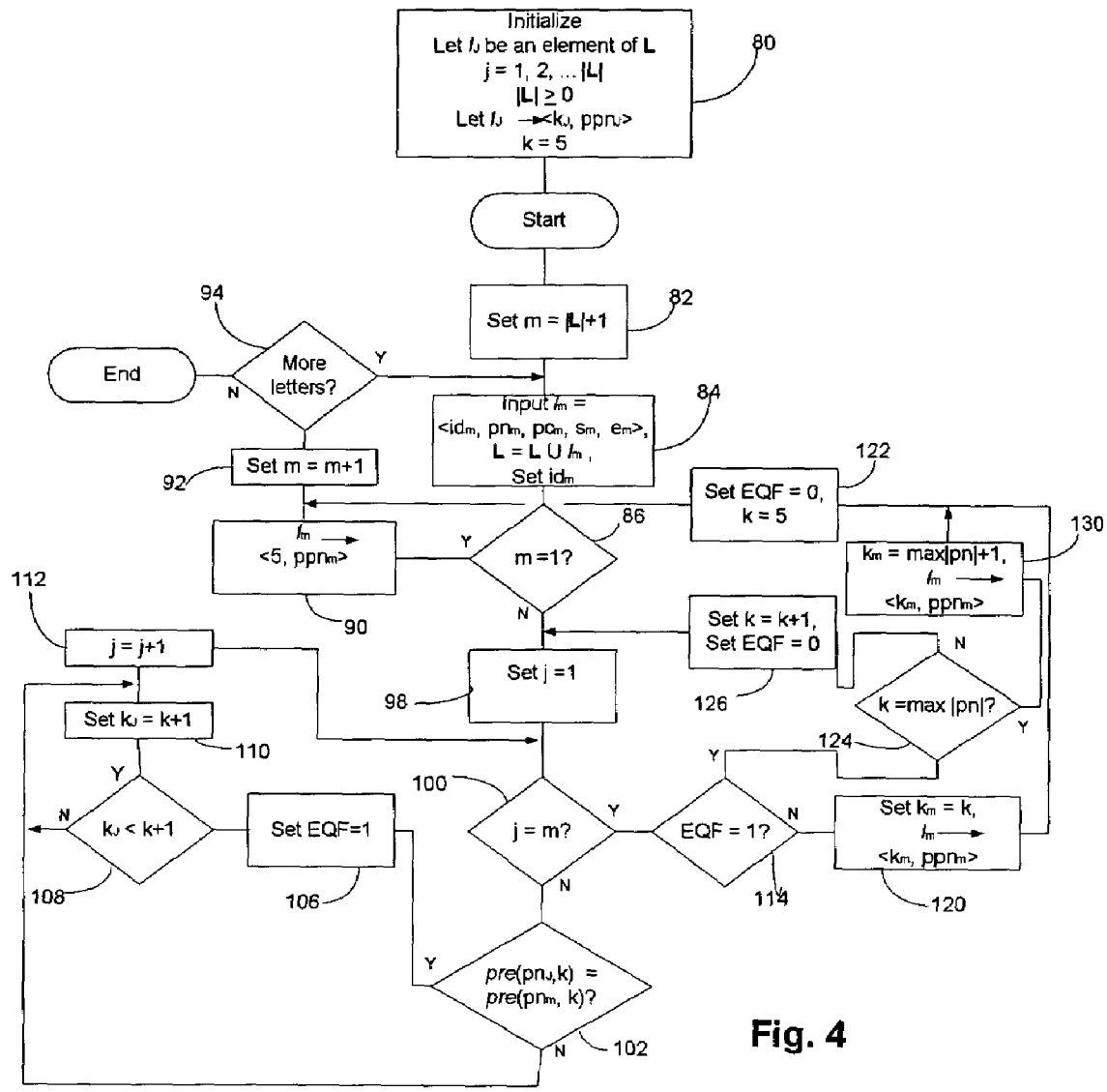
FIG. 4 shows a flow diagram of the operation of a server in updating or generating a minimal k-uniquely identified mapping on a set of letters L in accordance with one embodiment of the subject invention.

FIG. 4 shows a flow diagram of the operation of server 22 in updating or generating a set L which is minimally k-uniquely mapped by a mapping θ such that θ($l_i$)=<$k_i$, $ppn_i$>. Set L is defined as k-uniquely mapped if for each letter $l_i$ in L: $l_i$→<$k_i$, $ppn_i$>, $k_i$ an integer such that min|pn|≦$k_i$≦max|pn| (where preferably min|pn|=5, max|pn|=11), if and only if for all letters $l_i$, $l_j$, in L, i≠j, <$pc_i$, pre($pn_i$, $k_i$)>≠<$pc_j$, pre($pn_j$, $k_i$)>. Set L is defined as minimally k-uniquely mapped if L is k-uniquely mapped, and for all letters $l_i$, $l_j$, in L, $k_i$>|pn|, <$pc_i$, pre($pn_i$, $k_i$−1)>=<$pc_j$, pre($pn_j$, $k_i$−1)>. That is: if set L is minimally k-uniquely mapped then for each letter $l_i$ $k_i$, if it exists, specifies the minimum number, greater than min|pn|, of initial digits of $pn_i$ which are sufficient to distinguish <$pc_i$, $pn_i$> from all other<$pc_j$, $pn_j$>, and thus distinguish $l_i$ from all other letters $l_j$ in L.

(It should be noted that there is a one-to-one correspondence between n-tuples contained in fields l and corresponding physical letters, and a similar correspondence between n-tuples <d, f, t, pn, pc> and events, and that what are actually matched in accordance with the subject invention are corresponding records in database 24. Accordingly, except where the difference may be both significant and unclear, the terms "letters" and "events" are used herein to refer to both physical letters and events and the corresponding n-tuples, <id, pn, pc, s, ed> and <d, f, t, pn, pc>, respectively.)

Initially at step 80 in FIG. 4 letter set L includes letters $l_j$, j=1, 2, . . . |L| or may be empty. Letters $l_j$→<$k_j$, $ppn_j$>; where $k_j$ is a positive integer representing a previous minimal k-unique mapping of |L|. The index k is initially set equal to min|pn|, which is preferably equal to 5. (Set L is assumed to have been previously sorted so that for all letters $l_i$, $l_j$ in L, it can be assumed, without loss of generality, that $pc_i$=$pc_j$.)

After starting, at step 82 server 22 sets m=1 and at step 84 inputs a new letter $l_m$=<$id_m$, $pn_m$, $pc_m$, $s_m$, $ed_m$>. For ease of description letter $l_m$ is assumed to be input as it is scanned for the first time, as would be the case, for example, with a BRE. For letters in mailings it can be that the life span, <$s_m$, $e_m$>, is determined when the mailing is delivered to facility 14, as described above, and server 22 will match letter $l_j$ to the appropriate life span in accordance with $pc_m$ when letter $l_j$ is first scanned separately. This operation would be well within the abilities of one skilled in the art and need not be described further here for an understanding of the subject invention. In either case, at step 84 an arbitrary unique identifier $id_m$ is added to field $l_m$ in record 62-m (shown in FIG. 3). This identifier is used to identify record 62-m in database 24 and is typically not included on physical letters l.

Then at step 86, server 22 tests to determine if m=1, and, if so, at step 90 maps $l_m$=$l_1$ to <5, $ppn_m$>, since at this point only $l_1$ is in L. Then at step 92 server 22 sets m=m+1, and at step 94 determines if there are any more letters to be input. If not the program ends and, otherwise returns to step 84.

Thereafter, for each letter $l_m$, at step 98 server 22 sets j=1 and at step 100 tests to determine if j=m and if not at step 102 tests if pre($pn_j$, k)=pre($pn_m$, k). That is, if the first k characters (initially 5 characters) of $pn_j$ equal the first k characters of $pn_m$. If so, at step 106 the equals flag, EQF, is set equal to 1, and at step 108 server 22 tests to determine if $k_j$<k+1, and if so, at step 110 sets $k_j$=k+1; since step 102 has shown that at least k+1 characters are necessary to distinguish $pn_j$ from $pn_m$. Then, or if $k_j$ is less than k+1, or if at step 102 pre($pn_j$, k)≠pre($pn_m$, k), at step 112 server 22 sets j=j+1 and goes to step 100.

If at step 102 |pn$_j$| or |pn$_m$| are less than k, pn$_j$ or pn$_m$ are filed out with unknown characters "?" which are considered to match any character. For example, for pn=1,2,3,4,5 pre (pn, 7)≡1,2,3,4,5,?,? and is considered to equal 1,2,3,4,5,x,y; where "x" and "y" can be any character, including "?".

If at step 100 j=m, server 22 goes to step 114 to determine if EQF is set. Since 1$_m$ has been tested at step 102 against 1$_j$ for all j, j<m; and if EQF is not set then the current value of k is sufficient to uniquely distinguish letter 1$_m$ from all letters 1$_j$ in L, then if EQF is not set at step 120 k$_m$ is set equal to the current value for k and 1$_m$→<k$_m$, ppn$_m$>, i.e. <k, ppn$_m$> is stored in field 64-m (shown in FIG. 3) and L, as currently constituted, is minimally k-uniquely mapped. Then at step 122 EQF is reset and k is set equal to 5, and server 22 then goes to steps 92 and 94 and either exits or inputs a next letter, as described above.

If EQF is set at step 114, then at step 124 server 22 determines if k=max|pn| (preferably max|pn|=11) and, if not, at step 126 sets k=k+1 and resets EQF and goes to step 98 to repeat the cycle described above for the next value for k. If k=max|pn|, then at step 130 k$_m$ is set equal to max|pn|+1 and 1$_m$→<k$_m$, X>, i.e. <max|pn|+1, X>, where X is arbitrary, is stored in field 64-m; indicating that for at least one j, ≠m, pn$_j$=pn$_m$ (and thus that 1$_j$ and 1$_m$ are not uniquely identified) and then goes to steps 122, 92, and 94, as described above.

(A file of previously scanned, unmapped letters 1 can be mapped by modifying the operation of server 22 as shown in FIG. 4 by:
  setting all k$_j$≦min|pn|
  setting m=1 at step 82, and
  deleting step 84.)

Figure 5:
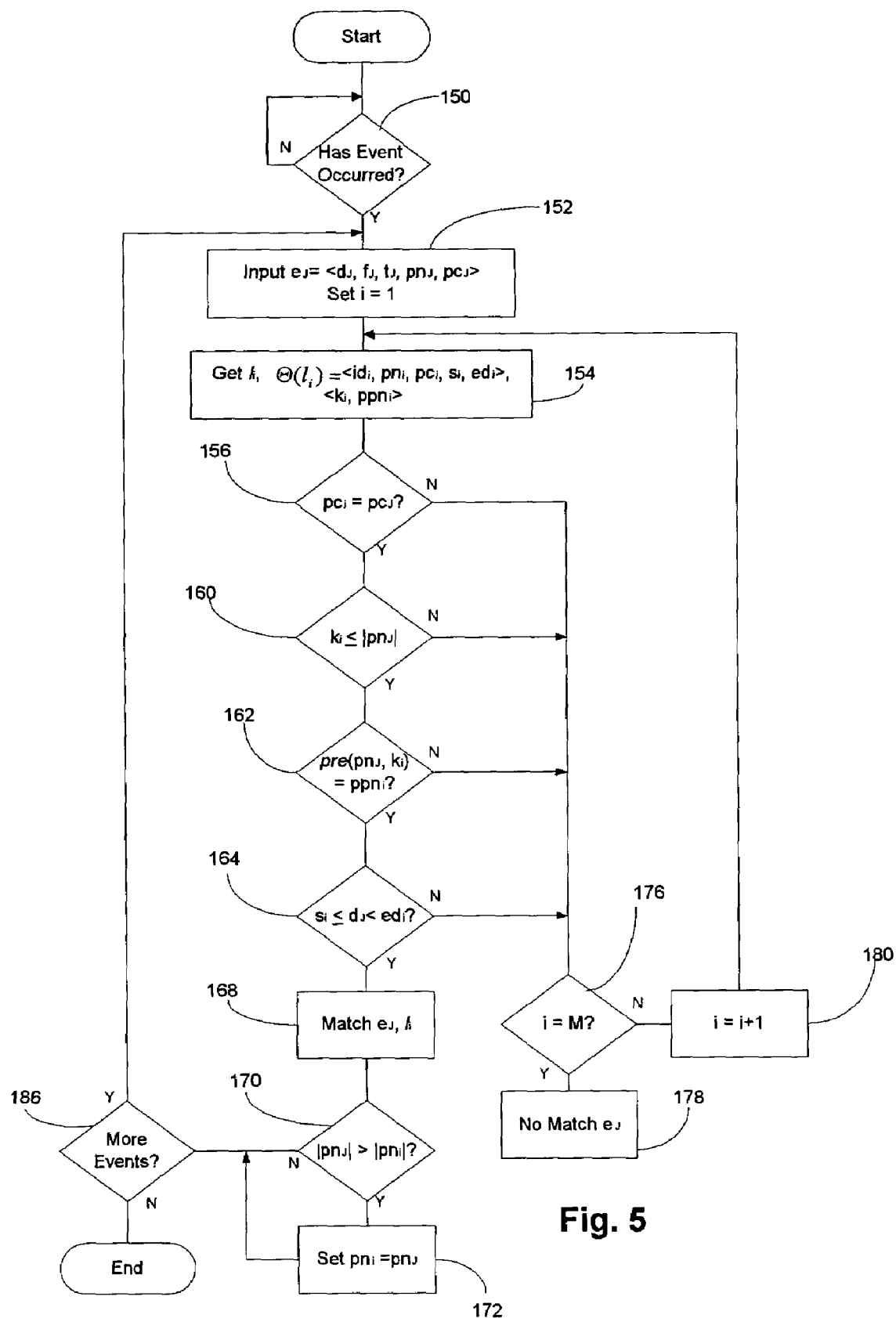
FIG. 5 shows a flow diagram of the operation of a server in matching events e in a set of events E to letters l in a set of letters L in accordance with one embodiment of the subject invention.

FIG. 5 shows a flow diagram of the operation of server 22 in matching events e in set E to letters 1 in set L. At step 150 server 22 waits for the occurrence of an event in the delivery process. When an event e$_j$ occurs during delivery of a letter 1 server 22 inputs event e$_j$=<d$_j$, f$_j$, t$_j$, pn$_j$, pc$_j$> and sets i=1 at step 152. At step 154 server 22 gets 1$_i$ and ⊖(1$_i$); that is, it obtains fields 1$_i$ and 64-i in record 62-i in file 60 (shown in FIG. 3).

Tests at steps 156 through 164 are then applied to determine if event e$_j$ is uniquely matched to letter 1$_i$. At step 156 it is determined if pc$_j$ equals pc$_i$. If so, at step 160 it is determined if k$_i$ is less than or equal to |pn$_j$|; that is if there are sufficient characters in pn$_j$, as scanned, to uniquely match e$_j$ and 1$_i$. Note that this test prevents a match if k$_i$ is greater than max|pn|; i.e. 1$_i$ is not uniquely identified in L. If so, then at step 162 it is determined if pre(pn$_j$, k$_i$) is equal to ppn$_i$; that is if the first k$_i$ characters of pn$_j$ and pn$_i$ are equal; which serves to uniquely establish a match. Then, as a consistency check, at step 164 it is determined if s$_i$<d$_j$<ed$_i$; that is if event e$_j$ has occurred during the life period of letter 1$_i$. If all the above tests are passed then at step 168 event e$_j$ is uniquely matched to letter 1$_i$;, preferably by storing <d$_j$, f$_j$, t$_j$, pn$_j$, pc$_j$> in field e$_j$ in record 68-i so that it is associated with identification id$_i$ in field 70-i (shown FIG. 3).

Approximately 2 to 8% of letters which should have a full POSTNET code are initially produced or described by mailers with less than the full 11 digits. In at least some cases the USPS has the capability to correct this and provide the full POSTNET code, with the result that |pn$_j$| will be greater than |pn$_i$|. (The manner in which this correction is made forms no part of the subject invention and need not be described further here.) Accordingly, in the preferred embodiment shown, at step 170 server 22 determines if |pn$_j$|>|pn$_i$|, and, if so, at step 172 sets pn$_i$=pn$_j$ so that the full, or extended, value can be used for matching later, downstream events.

Then at step 186 server 22 determines if any more events are pending, and if so returns to step 152 to process the next event, and otherwise exits. If any of the above described tests are not passed then at step 176 server 22 determines if i equals M; that is if all letters 1 have been tested. If so, at step 178 a no match is recorded for event e$_j$ in any convenient manner and server 22 goes to step 170 and continues as described above. Otherwise i is set equal to i+1 at step 180 and server 22 returns to step 154.

In other embodiments of the subject invention other consistency tests can be used in addition to or in place of the test of step 164. For example the type t$_j$ and location d$_j$ can be tested for consistency; e.g. automatic sortation at a facility lacking such equipment.

Those skilled in the art will recognize that where event e$_j$ is the entry of a letter 1$_i$ into the delivery process then it is only necessary to start a new record 68-i in file 66 including entry event e$_j$.

Figure 1:
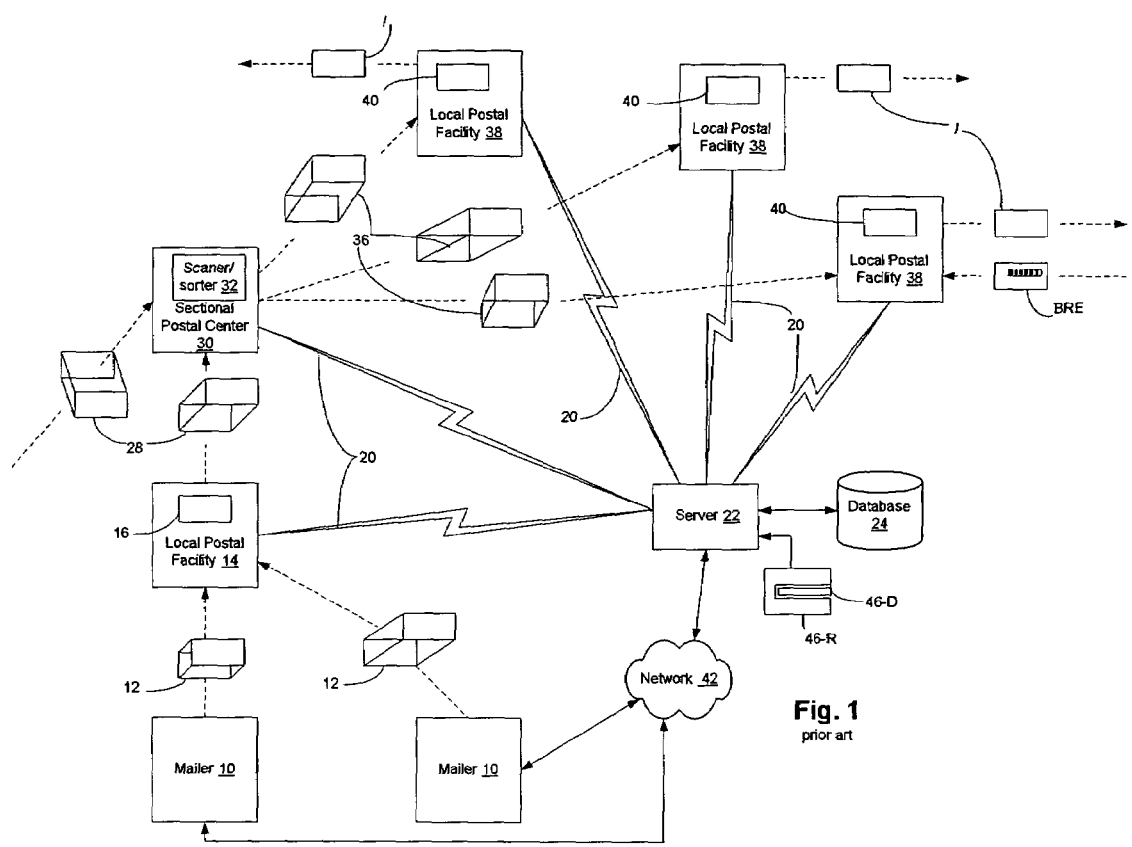
FIG. 1 shows a schematic block diagram of a simplified representation of a postal delivery system.
Figure 2:
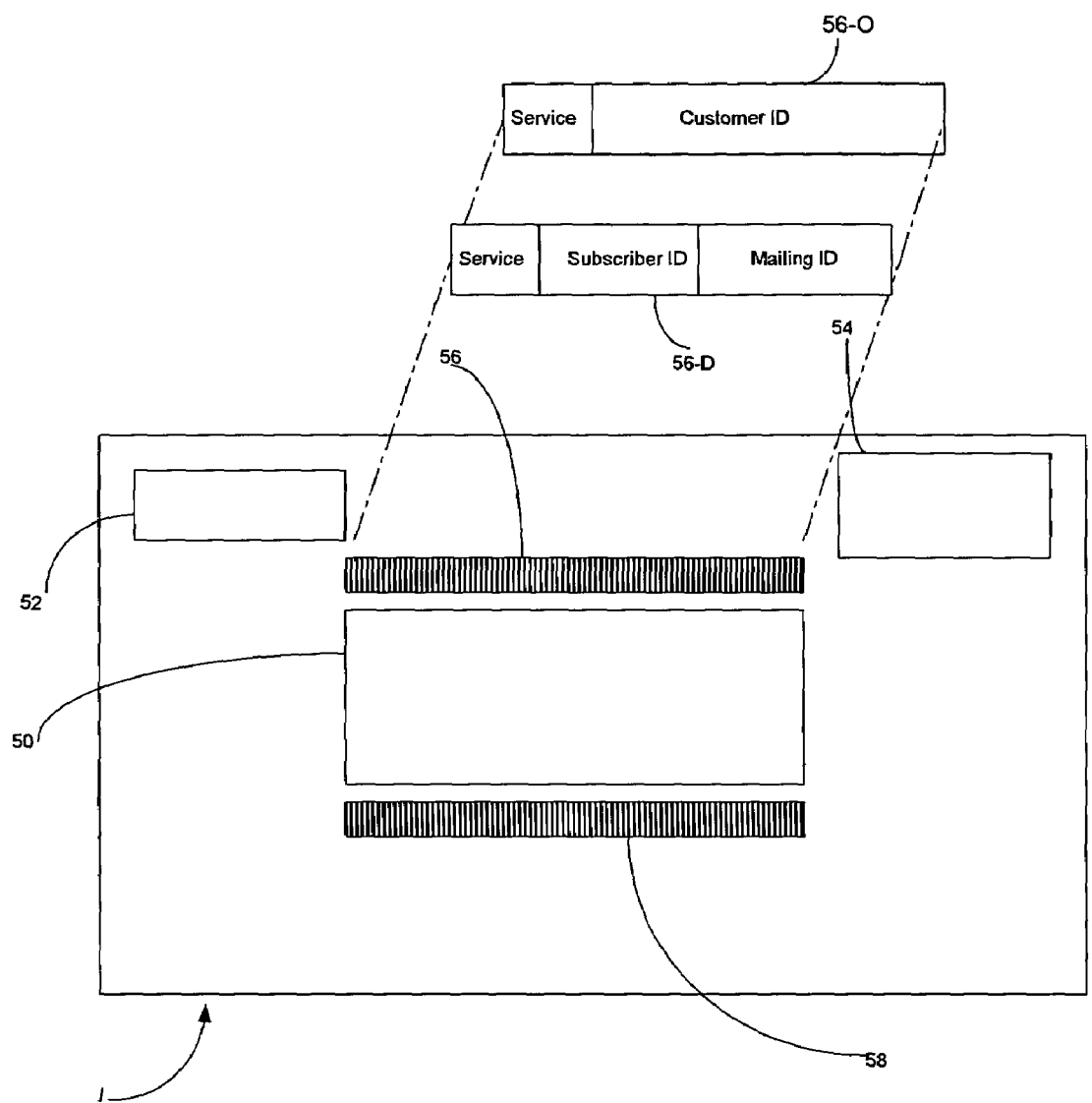
FIG. 2 shows a schematic representation of a plan view of a letter mailpiece.

Returning to FIG. 1, when one of mailers 10 wishes to determine the status of a letter 1 in a mailing, or if a BRE in a mailing has been returned, an inquiry can be submitted to server 22 through network 42. Server 22 can then access database 24 to identify relevant events which have occurred; and from the above description it will apparent to those skilled in the art that events will be identified if and only if they are deterministically matched to a letter.

The embodiments described above and illustrated in the attached drawings have been given by way of example and illustration only. From the teachings of the present application those skilled in the art will readily recognize numerous other embodiments in accordance with the subject invention. Particularly it will be apparent to those skilled in the art that the sequences of steps and data structures described above can be altered in numerous logically equivalent ways without departing from the scope of the subject invention. Accordingly, limitations on the subject invention are to be found only in the claims set forth below.

What is claimed is:

1. A method for deterministically matching first elements of a first set of objects or events with second elements of a second set of objects or events, matching first and second elements each being associated with common values of an identification code pn having |pn| characters, and where said identification code can be insufficient to uniquely identify said first elements, and portions of said identification code values associated with said first and second elements can be unknown; comprising the steps of:

a) generating a mapping θ for said first set such that, for each element 1$_i$ of said first set θ(1$_i$) equals <k$_i$, ppn$_i$>, where pn$_i$ is at least a portion of said identification code value associated with said element 1$_i$ and ppn$_i$ is defined as the first k$_i$ characters of pn$_i$, and k$_i$ is selected to be the minimum number of characters required to uniquely identify 1$_i$ in said first set, whereby values for k$_i$ greater than |pn| imply that said element 1$_i$ is not uniquely identified by said portion ppn$_i$;

b) determining pn$_j$ for an element e$_j$ in said second set, where pn$_j$ is at least a portion of said identification code value associated with said element e$_j$; and c) matching said element e$_j$ and said element 1$_i$ only if the first k$_i$ characters of pn$_j$ equal ppn$_i$ and not matching said element e$_j$ and said element 1$_i$ if said element 1$_i$ is not uniquely identified in said first set by said portion pn$_i$.

2. A method as described in claim 1 where said first elements are letters and said second elements are events which occur during processing of said letters.

3. A method as described in claim 1 where, if elements $e_j$ and $l_i$ match, and the number of characters in $pn_j$ is greater than the number of characters in $pn_i$, $pn_i$ is set equal to $pn_j$.

4. A method for deterministically matching letters in a first set with events in a second set, matching letters and events each being associated with common values of an identification code <pn, pc>, where pn is a postal delivery code including at most |pn| characters and pc is a tracking code, and where said code pc is constant for all said letters and said identification code can be insufficient to uniquely identify said letters, and portions of said delivery code pn associated with said letters and said events can be unknown; comprising the steps of:

a) generating a mapping θ for said first set such that, for each letter $l_i$ in said first set $\theta(l_i)$ equals <$k_i$, $ppn_i$>, where $pn_i$ is at least a portion of pn in said identification code value <pn, pc> associated with said letter $l_i$, and $ppn_i$ is defined as the first $k_i$ characters of $pn_i$, and $k_i$ is selected to be the minimum number of characters required to uniquely identify said letter $l_i$ in said first set, whereby values for $k_i$ greater than |pn| imply that said letter $l_i$ is not uniquely identified by said portion $ppn_i$;

b) determining $pn_j$ for an event $e_j$ in said second set, where $pn_j$ is at least a predetermined portion of pn in said identification code value <pn, pc> associated with said event $e_j$; and c) matching said event $e_j$ and said letter $l_i$ only if the first $k_i$ characters of $pn_j$ equal $ppn_i$ and not matching said event $e_j$ and said letter $l_i$ if said letter $l_i$ is not uniquely identified in said first set by said portion $pn_j$.

5. A method as recited in claim 4 where the number of said letters in said first set |L| is greater than or equal to 0, further comprising a step of adding a new letter $l_m$, to said first set.

6. A method as recited in claim 4 further comprising a step of performing an additional consistency test and matching said letter $l_i$ and event $e_j$ only if said consistency test confirms such match.

7. A method as described in claim 6 where a time $d_i$ is associated with said event $d_j$ and times $ed_i$ and $s_i$ are associated with said letter $l_i$ and said consistency test comprises determining if said time $s_i$ is less than or equal to said time $d_j$ and said time $d_j$ is less than or equal to said time $ed_i$; where said time $ed_i$ is the estimated latest time of delivery of said letter $l_i$ and said time $s_i$ is the time said letter $l_i$ entered a delivery process.

8. A method for deterministically matching first elements of a first set of objects or events with second elements of a second set of objects or events, matching first and second elements each being associated with common values of an identification code pn having |pn| characters, and where said identification code can be insufficient to uniquely identify said first elements, and portions of said identification code values associated with said first and second elements can be unknown; comprising the steps of:

a) generating a minimal k-unique mapping for said first set such that, for each element $l_i$ of said first set such that $l_i$ maps to a pair <$k_i$, $ppn_i$>, where $pn_i$ is at least a portion of said identification code value pn associated with said first elements and $ppn_i$ is defined as the first $k_i$ characters of $pn_i$;

b) determining $pn_j$ for an element $e_j$ in said second set, where $pn_j$ is at least a portion of said identification code value associated with said element $e_j$; and c) matching said element $e_j$ and said element $l_i$ only if the first $k_i$ characters of $pn_j$ equal $ppn_i$ and not matching said element $e_j$ and said element $l_i$ if said element $l_i$ is not uniquely identified in said first set.

9. A method as described in claim 8 where said first elements are letters and said second elements are events which occur during processing of said letters.

10. A data processing system for deterministically matching first elements of a first set of objects or events with second elements of a second set of objects or events, matching first and second elements each being associated with common values of an identification code pn having |pn| characters, and where said identification code can be insufficient to uniquely identify said first elements, and portions of said identification code values associated with said first and second elements can be unknown; said data processing system being programmed to:

a) generate a mapping θ for said first set such that, for each element $l_i$ of said first set $\theta(l_i)$ equals <$k_i$, $ppn_i$>, where $pn_i$ is at least a portion of said identification code value associated with said element $l_i$ and $ppn_i$ is defined as the first $k_i$ characters of $pn_i$, and $k_i$ is selected to be the minimum number of characters required to uniquely identify $l_i$ in said first set, whereby values for $k_i$ greater than |pn| imply that said element $l_i$ is not uniquely identified by said portion $ppn_i$;

b) input $pn_j$ for an element $e_j$ in said second set, where $pn_j$ is at least a portion of said identification code value associated with said element $e_j$; and c) match said element $e_j$ and said element $l_i$ only if the first $k_i$ characters of $pn_j$ equal $ppn_i$ and not match said element $e_j$ and said element $l_i$ if said element $l_i$ is not uniquely identified in said first set by said portion $pn_j$.

11. A data processing system as described in claim 10 said data processing system being further programmed to, if elements $e_j$ and $l_i$ match, and the number of characters in $pn_j$ is greater than the number of characters in $pn_i$, set $pn_i$ equal to $pn_j$.

12. A data processing system for deterministically matching letters in a first set with events in a second set, matching letters and events each being associated with common values of an identification code <pn, pc>, where pn is a postal delivery code including at most |pn| characters and pc is a tracking code, and where said code pc is constant for all said letters and said identification code can be insufficient to uniquely identify said letters, and portions of said delivery code pn associated with said letters and said events can be unknown; said data processing being programmed to:

a) generate a mapping θ for said first set such that, for each letter $l_i$ in said first set $\theta(l_i)$ equals <$k_i$, $ppn_i$>, where $pn_i$ is at least a portion of pn in said identification code value <pn, pc> associated with said letter $l_i$, and $ppn_i$ is defined as the first $k_i$ characters of $pn_i$, and $k_i$ is selected to be the minimum number of characters required to uniquely identify said letter $l_i$ in said first set, whereby values for $k_i$ greater than |pn| imply that said letter $l_i$ is not uniquely identified by said portion $ppn_i$;

b) input $pn_j$ for an event $e_j$ in said second set, where $pn_j$ is at least a predetermined portion of pn in said identification code value <pn, pc> associated with said event $e_j$; and c) match said event $e_j$ and said letter $l_i$ only if the first $k_i$ characters of $pn_j$ equal $ppn_i$ and not match said event $e_j$ and said letter $l_i$ if said letter $l_i$ is not uniquely identified in said first set by said portion $pn_j$.

13. A data processing system as recited in claim 12 where the number of said letters in said first set |L| is greater than or equal to 0, and said data processing system is further programmed to add a new letter $l_m$, to said first set.

14. A data processing system as recited in claim 12 where said data processing system is further programmed to perform an additional consistency test and match said letter $l_i$ and event $e_j$ only if said consistency test confirms such match.

15. A data processing system as recited in claim 14 where a time $d_i$ is associated with said event $d_i$ and times $ed_i$ and $s_i$ are associated with said letter $l_i$ and said consistency test comprises determining if said time $s_i$ is less than or equal to said time $d_i$ and said time $d_i$ is less than or equal to said time $ed_i$; where said time $ed_i$ is the estimated latest time of delivery of said letter $l_i$ and said time $s_i$ is the time said letter $l_i$ entered a delivery process.

16. A data processing system for deterministically matching first elements of a first set of objects or events with second elements of a second set of objects or events, matching first and second elements each being associated with common values of an identification code pn having |pn| characters, and where said identification code can be insufficient to uniquely identify said first elements, and portions of said identification code values associated with said first and second elements can be unknown; said data processing system being programmed to:
  a) generate a minimal k-unique mapping for said first set such that, for each element $l_i$ of said first set such that $l_i$ maps to a pair $<k_i, ppn_i>$, where $pn_i$ is at least a portion of said identification code value pn associated with said first elements and $ppn_i$ is defined as the first $k_i$ characters of $pn_i$,
  b) input $pn_j$ for an element $e_j$ in said second set, where $pn_j$ is at least a portion of said identification code value associated with said element $e_j$; and
  c) match said element $e_j$ and said element $l_i$ only if the first $k_i$ characters of $pn_j$ equal $ppn_i$ and not match said element $e_j$ and said element $l_i$ if said element $l_i$ is not uniquely identified in said first set.

17. A computer readable medium for providing program code for execution by a programmable data processor, said processor being responsive to said program code to:
  a) generate a mapping $\theta$ for a first set such that, for each element $l_i$ of said first set $\theta(l_i)$ equals $<k_i, ppn_i>$, where $pn_i$ is at least a portion of an identification code value associated with said element $l_i$ and $ppn_i$ is defined as the first $k_i$ characters of $pn_i$, and $k_i$ is selected to be the minimum number of characters required to uniquely identify $l_i$ in said first set;
  b) input $pn_j$ for an element $e_j$ in a second set, where $pn_j$ is at least a portion of said identification code value associated with said element $e_j$; and
  c) match said element $e_j$ and said element $l_i$ only if the first $k_i$ characters of $pn_j$ equal $ppn_i$ and not match said element $e_j$ and said element $l_i$ if said element $l_i$ is not uniquely identified in said first set by said portion $pn_j$.

18. A computer readable medium for providing program code for execution by a programmable data processor, said processor being responsive to said program code to:
  a) generate a mapping $\theta$ for said a set of letters l such that, for each letter $l_i$ in said first set $\theta(l_i)$ equals $<k_i, ppn_i>$, where $pn_i$ is at least a portion of pn in an identification code value $<pn, pc>$ associated with said letter $l_i$, and $ppn_i$ is defined as the first $k_i$ characters of $pn_i$, and $k_i$ is selected to be the minimum number of characters required to uniquely identify said letter $l_i$ in said first set;
  b) input $pn_j$ for an event $e_j$ in a second set, where $pn_j$ is at least a predetermined portion of pn in said identification code value $<pn, pc>$ associated with said event $e_j$; and
  c) match said event $e_j$ and said letter $l_i$ only if the first $k_i$ characters of $pn_j$ equal $ppn_i$ and not match said event $e_j$ and said letter $l_i$ if said letter $l_i$ is not uniquely identified in said first set by said portion $pn_j$.

19. A system for matching letters with events occurring during delivery of said letters, said system comprising:
  a) a scanner for scanning code $<pn, pc>$, where pn is a postal delivery code including at most |pn| characters and pc is a tracking code, printed on said letters during occurrence of one of said events;
  b) a data processing system communicating with said scanner to input said code $<pn, pc>$ and for deterministically matching letters in a first set with events in a second set, matching letters and events each being associated with common values of said identification code $<pn, pc>$.

20. A system as described in claim 19 where said data processing system is programmed to:
  a) generate a mapping $\theta$ for said first set such that, for each letter $l_i$ in said first set $\theta(l_i)$ equals $<k_i, ppn_i>$, where $pn_i$ is at least a portion of pn in said identification code value $<pn, pc>$ associated with said letter $l_i$, and $ppn_i$ is defined as the first ki characters of $pn_i$, and $k_i$ is selected to be the minimum number of characters required to uniquely identify said letter $l_i$ in said first set, whereby values for $k_i$ greater than |pn| imply that said letter $l_i$ is not uniquely identified by said portion $ppn_i$;
  b) input $pn_j$ for an event $e_j$ in said second set, where $pn_j$ is at least a predetermined portion of pn in said identification code value $<pn, pc>$ associated with said event $e_j$; and
  c) match said event $e_j$ and said letter $l_i$ only if the first $k_i$ characters of $pn_j$ equal $ppn_i$ and not match said event $e_j$ and said letter $l_i$ if said letter $l_i$ is not uniquely identified in said first set by said portion $pn_j$.

21. A system as described in claim 19 where said data processing system is programmed to:
  a) generate a minimal k-unique mapping for said first set such that, for each element $l_i$ of said first set such that $l_i$ maps to a pair $<k_i, ppn_i>$, where $pn_i$ is at least a portion of said identification code value pn associated with said first elements and $ppn_i$ is defined as the first $k_i$ characters of $pn_i$,
  b) input $pn_j$ for an element $e_j$ in said second set, where $pn_j$ is at least a portion of said identification code value associated with said element $e_j$; and
  c) match said element $e_j$ and said element $l_i$ only if the first $k_i$ characters of $pn_j$ equal $ppn_i$ and not match said element $e_j$ and said element $l_i$ if said element $l_i$ is not uniquely identified in said first set.

* * * * *